Patented May 14, 1940

2,200,737

UNITED STATES PATENT OFFICE 2,200,737

ELECTRIC WELDING

Edwin A. Clapp, Niagara Falls, N. Y., assignor to The Linde Air Products Company, a corporation of Ohio No Drawing. Application August 10, 1937,
Serial No. 158,292

2 Claims. (Cl. 219—10)

The invention relates to electric welding and provides modification of, and improvements in, an electric welding process of the type described in Patent 2,043,960 issued to Lloyd Theodore Jones, Harry Edward Kennedy, and Maynard Arthur Rotermund.

Electric welding processes of this type are characterized notably by the use of a deep layer or blanket of comminuted glasslike material which covers the welding region on the workpiece and in which an end of the welding electrode is continuously submerged. A relatively heavy electric current is passed through the electrode, blanket, and workpiece to melt successive portions of the electrode, blanket, and workpiece, to deposit molten electrode metal and to coalesce the deposited metal with the metal of the workpiece, and to maintain a subsurface pool of molten glasslike material above the molten metal. A quiet layer of unmelted comminuted glasslike material is maintained above the subsurface pool. Despite the use of heavy electric currents, there is no external visual evidence of the presence of an electric arc of the ordinary type, and presumably none is present.

In such electric welding processes, the chemical composition of the glasslike material or welding agent has a profound influence upon the quality of the completed weld. The highest quality of weld is at least as sound, strong, and ductile as the metal workpiece. Welds containing voids, cracks, fissures, or occluded slag, or deficient in strength, ductility, or toughness, are undesirable wherever the standard of quality is high. It has been observed that the calcium-magnesium-aluminum silicates, preferably containing calcium fluoride, described in detail in Patent 2,043,960, are well adapted for the production of excellent welds in most steels.

I have found, however, that under some circumstances difficulties are encountered in producing a completely satisfactory weld by the use of these mixtures of calcium-magnesium-aluminum silicates with calcium fluoride. Investigation discloses that weld metal deposited through these materials loses manganese and gains silicon during the welding operation. As much as 60% or 70% of the manganese content of the weld filler material may be lost, and the gain in silicon is often significant. In many welding operations, such changes in the composition of the weld filler material are unimportant; but in others, the changes result unfavorably. For instance, if the steel workpiece has a rather high sulfur content, say 0.03% or 0.05%, or contains sulfur bands, unsound welds having poor strength and ductility may be obtained if the manganese content of the weld is below about 0.4% or 0.5%. A high silicon content aggravates the poor conditions resulting from a low manganese content.

I have found that the loss of metallic manganese during welding may be decreased or eliminated by the use of an alkaline earth metal silicate welding agent containing manganese oxide in certain definite and critical proportions. The useful proportions of manganese oxide fall within the range of 4% to 16% of the welding agent, the oxide being calculated as MnO and the percentage varying correspondingly if another oxide of manganese is used. This range of proportions corresponds to about 3% to 12% manganese. If the manganese percentage is less than that corresponding to 4% MnO, the manganese content of the weld metal is not usefully affected, and if the manganese percentage is above that corresponding to 16% MnO, the welding conditions are adversely affected. The most valuable range is between 8% and 12% MnO (about 6.2% to 9.3% manganese), and for most purposes about 10% MnO gives optimum results.

Apart from manganese oxide, the welding agent consists primarily of silicates of one or more of the alkaline earth metals, and preferably contains aluminum silicate in an amount corresponding to 1% to 8% $Al_2O_3$.

The manganese oxide may be added as a manganese silicate in mere mechanical admixture with the other ingredients of the welding agent; but, preferably, it is fused with the silicates mentioned above to form a homogeneous glasslike substance.

As described in Patent 2,043,960, the depth and width of penetration of the weld metal, and the shape of the resulting weld, may ordinarily be controlled considerably by the addition of a halide salt, such as calcium fluoride. I have found, however, that halide salts have relatively little effect when the welding agent contains 4% to 16% MnO or its equivalent in other oxides of manganese. I have obtained excellent results in welding with an agent containing, by proximate analysis: 31% CaO, 7% MgO, 46.4% $SiO_2$, 4.7% $Al_2O_3$, 0.3% $Fe_2O_3$, and 10.6% MnO, without any halide. If desired, however, a small amount of halide salt, e. g., 5% of calcium fluoride, may be added.

Tests which I have conducted indicate clearly the improvement provided by the invention. For instance, a series of welds was made from flange quality steel plates, all of similar analyses. In each of the tests welding rods of the same composition were used. The tests differed in the composition of the welding agent or flux used. The following table gives the proximate analyses of the respective welding agents, the corresponding analyses of weld metal obtained in each case, and the results of tensile tests which were made in the completed welds. In the portion of the table relating to the tensile tests, the abbreviation "Y. P." indicates the measured yield point in thousands of pounds per square inch; "U. S." represents the measured ultimate strength in thousands of pounds per square inch; "El." is the percentage elongation obtained in 2 inches; and "R. A." is the percentage reduction in area. The tensile tests were made with standard 0.505-inch diameter tensile test specimens.

A typical analysis of the workpieces used is: 0.22% C; 0.37% Mn; 0.02% Si; 0.05% S, remainder iron. The electrode contained about 0.14% C; 1% Mn; and 0.3% Si, remainder iron. The electrodes were bare metal, not coated with flux.

| Agent No. | Analysis of welding agent | | | | | | Analysis of weld metal | | |
|---|---|---|---|---|---|---|---|---|---|
| | CaO | MgO | SiO$_2$ | Al$_2$O$_3$ | CaF$_2$ | MnO | Percent Mn | Percent Si | Percent C |
| 1 | 30.1 | 8.5 | 49.2 | 4.5 | 7.5 | Nil | 0.45 | 0.32 | 0.12 |
| 2 | 28.5 | 8.0 | 48.5 | 5 | 5 | 4.7 | .62 | .42 | .15 |
| 3 | 27 | 7.4 | 47 | 4.6 | 4.3 | 8.7 | .64 | .45 | .14 |
| ª4 | 26.4 | 9 | 51 | 4.6 | 5.3 | 4.8 | .51 | .30 | .18 |
| ª5 | 24.6 | 8.3 | 48.5 | 4.3 | 4.9 | 9.3 | .62 | .28 | .15 |
| ª6 | 22.9 | 7.8 | 47.8 | 4 | 4.6 | 12.8 | .74 | .27 | .15 |
| ª7 | 21.5 | 7.3 | 47.1 | 3.8 | 4.3 | 16 | .85 | .28 | .15 |
| 8 | 27 | 8.4 | 49.6 | 5 | Nil | 9 | .68 | .45 | .15 |
| 9 | 27 | 9.2 | 52.3 | 5.4 | Nil | 5.5 | .60 | .53 | .12 |

ªManganese added as mechanical mixture of manganese silicate.

| Agent No. | Tensile tests on completed weld | | | |
|---|---|---|---|---|
| | Y. P. | U. S. | Percent El. | Percent R. A. |
| 1 | 44.5 | 61 | 7 | 18.8 |
| 2 | 45 | 72 | 25.5 | 41.9 |
| 3 | 47 | 73 | 27 | 41 |
| 4 | 43.5 | 67 | 25 | 38.2 |
| 5 | 44 | 69 | 26 | 41.9 |
| 6 | 47 | 69.5 | 28 | 49.8 |
| 7 | 43.3 | 70.4 | 29 | 51.1 |
| 8 | 48 | 72.3 | 27 | 43.4 |
| 9 | 48.5 | 72 | 29 | 51 |

As in all welding processes of this type, it is desirable to avoid the presence, in the welding medium, of substances which evolve deleterious amounts of gas during the welding operation.

The invention is of particular value wherever, because of considerations of high sulfur content, soundness, or high strength, a weld containing more than 0.4% manganese is desired.

I claim:

1. In a process which comprises electrically melting metal from a bare metal electrode and coalescing the molten metal with metal of a steel workpiece containing sulfur bands or a sulfur content above 0.03%, while maintaining over the molten metal and the melting end of the electrode a conductive melt consisting principally of alkaline earth metal silicate substantially free from substances that evolve gas under welding conditions, the improvement which comprises incorporating a minor proportion of manganese oxide in said melt, the proportion of manganese in said oxide amounting to about 3% to 12% of the melt.

2. In the process defined in claim 1, the improvement which comprises incorporating manganese oxide in said melt, the proportion of manganese in said oxide amounting to about 6% to 9% of the melt.

EDWIN A. CLAPP.